United States Patent [19]

Misawa

[11] Patent Number: 4,771,839

[45] Date of Patent: Sep. 20, 1988

[54] STAIR-CLIMBING WHEELCHAIR CARRIER

[75] Inventor: Rintaro Misawa, Tokorozawa, Japan

[73] Assignee: Sunwa Sharyo Manufacturing Co., Ltd., Tokyo, Japan

[21] Appl. No.: 56,871

[22] Filed: Jun. 1, 1987

[30] Foreign Application Priority Data

Jun. 5, 1986 [JP] Japan .............................. 61-86316[U]

[51] Int. Cl.⁴ ............................................. B62B 5/02
[52] U.S. Cl. .................................. 180/8.2; 180/9.22; 280/5.22; 280/DIG. 10
[58] Field of Search ....................... 180/8.2, 9.22, 907; 280/5.22, DIG. 10

[56] References Cited

U.S. PATENT DOCUMENTS 4,432,426 2/1984 Misawa ................................ 180/8.2

FOREIGN PATENT DOCUMENTS 0213394 3/1987 European Pat. Off. ............. 180/8.2

Primary Examiner—John A. Pekar
Attorney, Agent, or Firm—Martin A. Farber

[57] ABSTRACT

A stair-climbing wheelchair carrier, comprising a carrier portion comprising a pair of endless belt crawlers, and a handle portion rotatably and detachably provided on the carrier. The handle portion is adapted to be rotated between an operating position and a wheelchair engaging position. The endless belt crawler has an oblique overhand portion which has a height higher than a usual height of a step of stair. A guide body is provided to mount a wheelchair secured to the handle portion so as to be rotated together with the handle portion to the operating position.

3 Claims, 6 Drawing Sheets

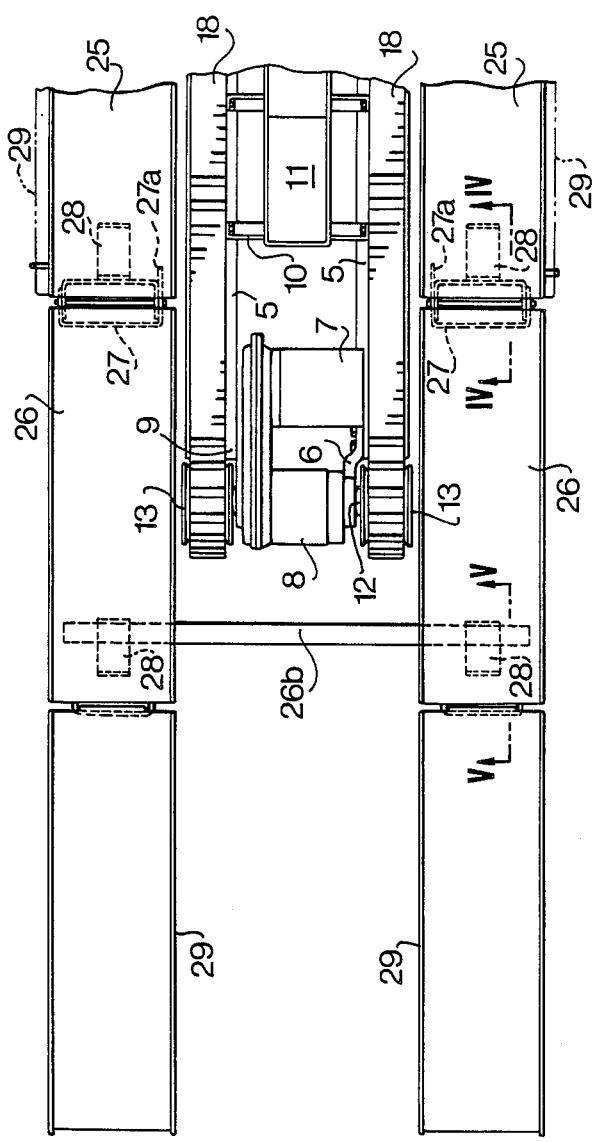
FIG. 3
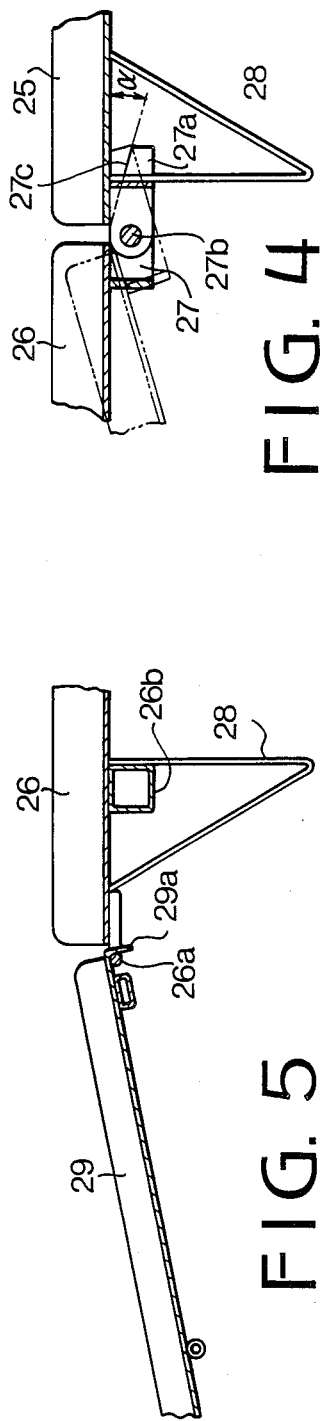
FIG. 4
FIG. 5

STAIR-CLIMBING WHEELCHAIR CARRIER

BACKGROUND OF THE INVENTION

The present invention relates to a stair-climbing wheelchair carrier on which a wheelchair with a disabled passenger seated therein may be easily mounted, and particularly to a stair-climbing wheelchair carrier which is easily operable in loading and also in unloading.

In a stair-climbing carrier with a crawler for the transportation of the disabled seated in this wheelchair up and down the stairs, the crawler must have an overhang inclined portion which has a height higher than a usual height of a step of the stair. Consequently, the crawler of the conventional stair-climbing carrier has an inclined upper travelling portion.

U.S. Pat. No. 4,432,426 discloses a stair-climbing wheelchair carrier. To mount a wheelchair on the carrier, the carrier is moved below the wheelchair on the ground and a handle grip portion of the wheelchair is fixed to a handle of the carrier. However, there are a manual type of wheelchair for sports without handle-grips or a type of battery operated wheelchair with low ground clearance. Accordingly, in the former type, the wheelchair can not be fixed to a handle of the carrier or, in the latter type, the carrier cannot be moved below the wheelchair on the ground.

SUMMARY OF THE INVENTION

The present invention is to overcome these inconveniences by the provision of an improved stair-climbing wheelchair carrier, having purposes to simplify in loading and unloading operation.

According to the present invention, there is provided a stair-climbing wheelchair carrier having a carrier portion comprising a frame, a pair of endless belt crawlers and a driving motor, each of said endless belt crawlers having a span extending over two steps and an oblique overhang portion at one end of said frame which has a height higher than a usual height of a step of stair, a handle portion rotatably and detachably provided on said carrier portion, said handle portion being adapted to be rotated between an operating position and a wheelchair engaging position, means for securing said handle portion to said frame. The carrier comprises a guide body provided to mount wheels of a wheelchair and secured to the handle portion so as to be rotated from the wheelchair engaging position to the operating position.

In an aspect of the invention, the guide body comprises a pair of wheel guide plates, a pair of caster guide plates and a pair of ramp plates which are hinged with each other.

The invention will now be described with reference to the following drawings of the preferred embodiments.

BRIEF DESCRIPTION OF THE DRAWINGS

FIG. 3 is a plan view partly showing the wheelchair carrier;

FIG. 4 is a sectional view of a guide body of the wheelchair carrier taken along a line IV—IV of FIG. 3;

FIG. 5 is a sectional view of the guide body taken along a line V—V of FIG. 3;

DETAILED DESCRIPTION OF PREFERRED EMBODIMENTS

Figure 1:
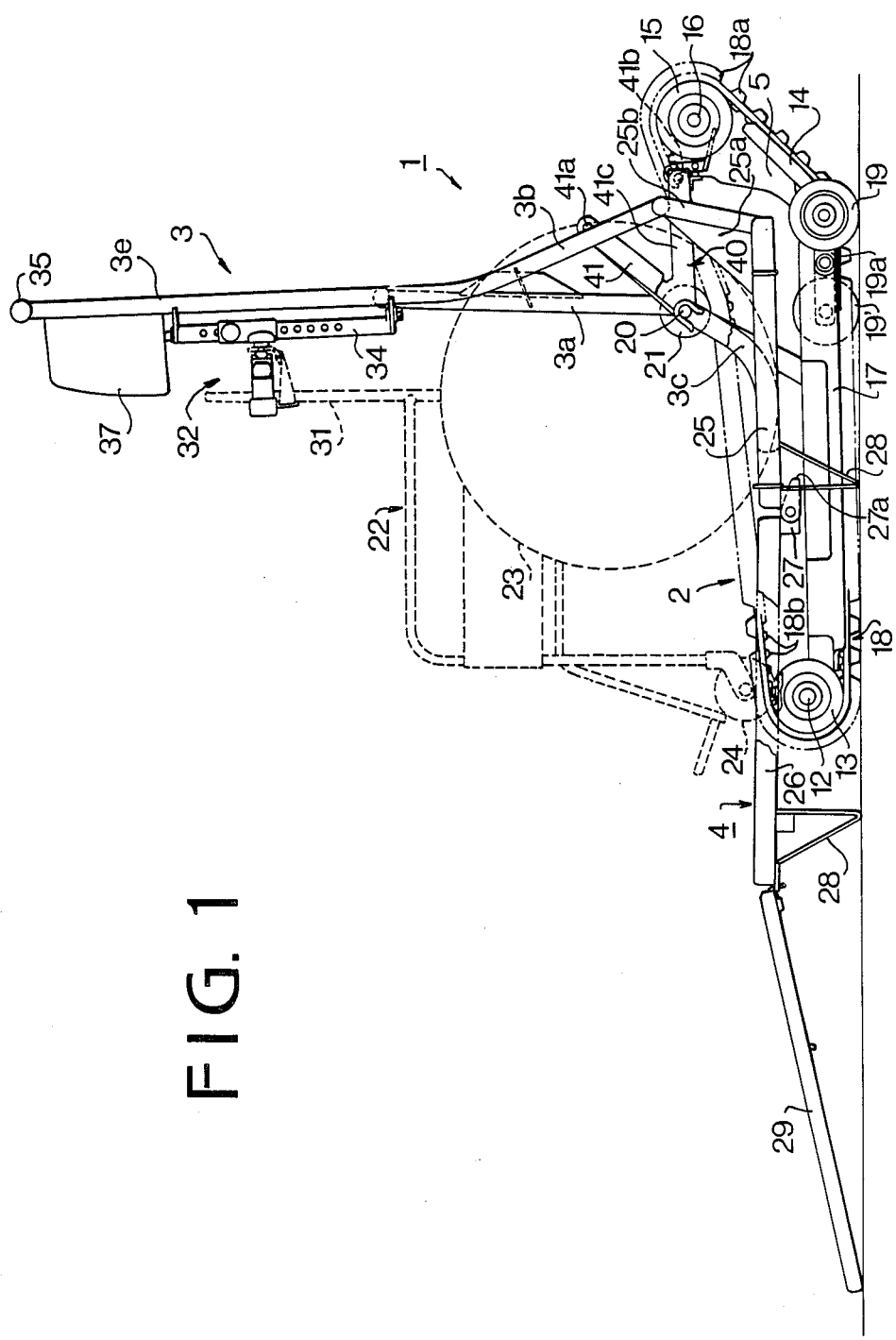
FIG. 1 is a side view showing a stair-climbing wheelchair carrier in accordance with one of preferred embodiments of the present invention.
Figure 2:
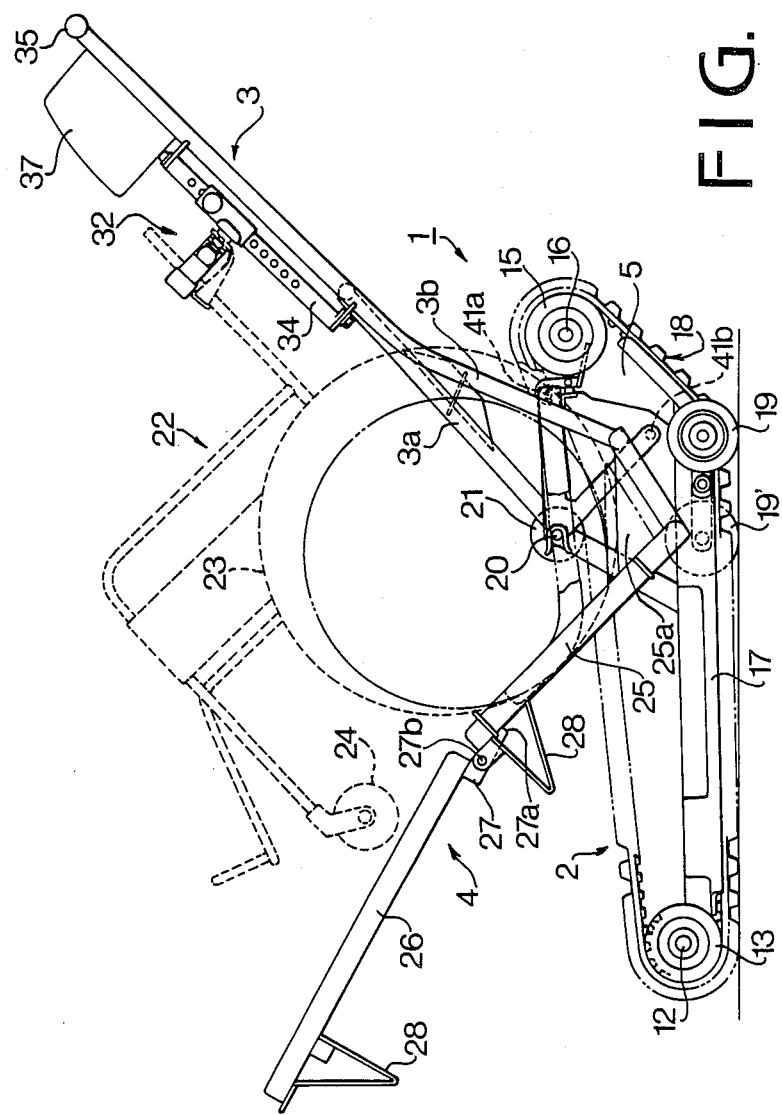
FIG. 2 is a side view showing an explanation of the operation of the wheelchair carrier.

FIGS. 1 and 2 are side views generally showing a stair-climbing wheelchair carrier 1 which is comprised of a wheelchair carrier portion 2, a handle portion 3, and a guide body 4 mechanically connected to the handle portion 3.

As shown in FIGS. 1 and 2, the wheelchair carrier portion 2 has a pair of rail-frames 5 of aluminium die-casting, rear ends of which are curved upwards like a sleigh. These frames 5 are disposed parallel on each side of the carrier 2. As shown in FIG. 3, flanges 9 formed on ends of the frames 5 are connected to each other through an attaching flange 6 of a reduction gear case which combines a driving motor 7 and a reduction gear 8. Connecting members 10 each having an L-shaped cross-section are bridged over the frames 5 at intermediate positions of the longitudinal dimension of the frame 5 to constitute the frame body of the wheelchair carrier. A battery 11 as a power source of the driving motor 7 is supported on the connecting members 10.

A pair of driving wheels 13 are secured to a driving shaft 12 connected to the reduction gear 8 and idlers 15 are mounted on shafts 16 provided on the rear and upper end of overhang portion. Each idling wheel 15 is rotatably attached to each end of idling shaft 16 provided at the upper end of an inclined guide portion 14. Engaged with a guide groove of the wheel 13, grounding guide portion 17, underface guide groove of overhand portion 14, and guide groove of the idling wheel 15 is a belt crawler 18. A pair of belt crawlers 18 are parallel, the distance between which is smaller than the distance between a pair of wheels of the wheelchair.

Considering the road and staircase condition, the belt crawlers 18 are made of elastic synthetic rubber to absorb shock as well as to protect the floor plate or staircase. The belt crawler 18 is provided with lugs 18a disposed at a predetermined interval to properly engage with steps of the stair. The inner surface of the belt crawler 18 is provided with lugs 18b engageable with driving teeth, preventing the belt crawler from slipping around the driving wheels 13. The belt crawler 18 has a span extending over at least two steps.

Each of the belt crawlers 18 has a pair of wheel 19, 19' provided near the inclined guide portion 14. Each pair of wheels 19, 19' are rotatably mounted on a wheel supporting arm 19a which is pivotally mounted on a shaft lateraly provided on the frame 5.

The handle portion 3 is attached to the wheelchair carrier 2 at a rear portion thereof near the idling wheel 15. The handle portion 3 is rotatably mounted on a shaft 20. The shaft 20 has a pair of idlers 21 rotatably mounted on opposite ends thereof. Each idler 21 engages with the belt crawler 18, so that the upper moving portion of the belt crawler 18 is deflected to a substantially horizontal plane.

Figure 6:
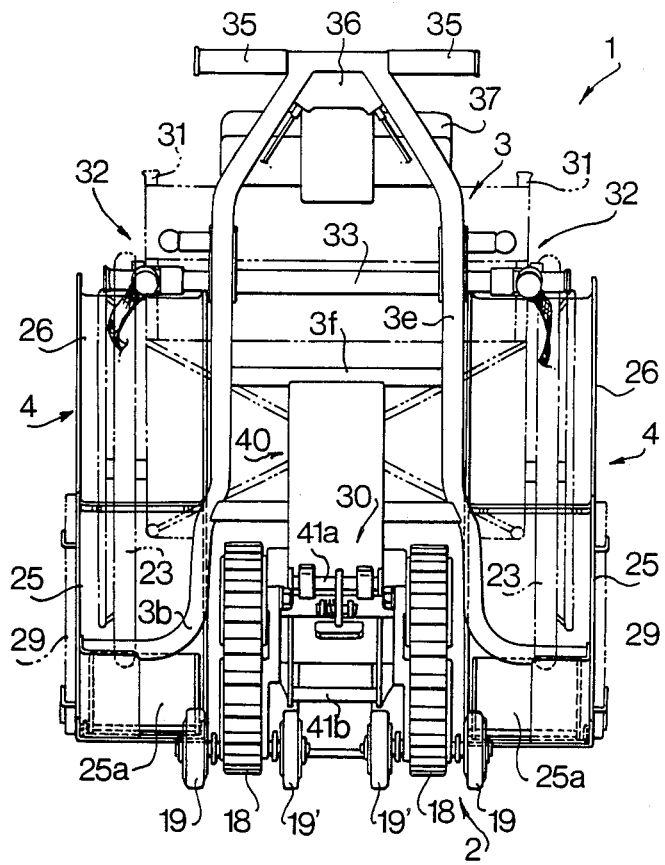
FIG. 6 is a rear view of the wheelchair carrier.
Figure 7:
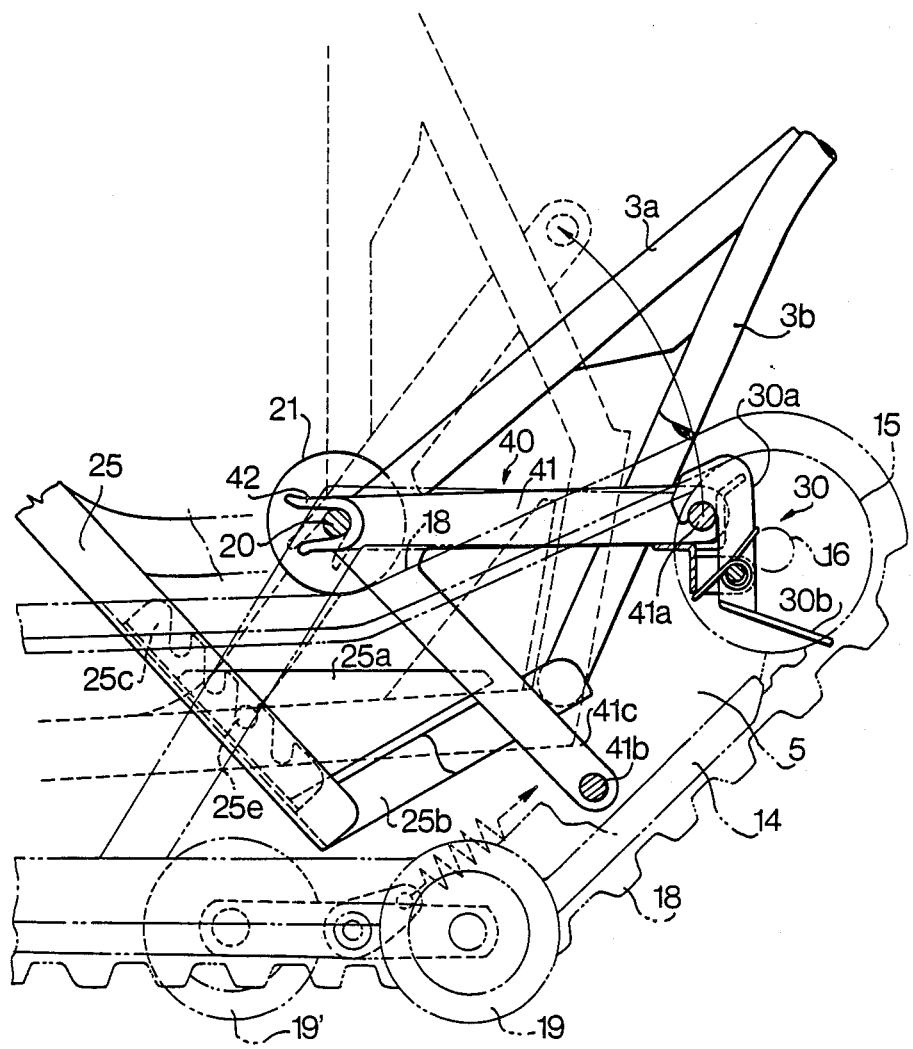
FIG. 7 is an enlarged side view partly showing the wheelchair carrier.

Referring to FIGS. 1 and 7, the handle portion 3 comprises a frame 3e having a reinforcement members 3f (FIG. 6), a pair of grips 35, a supporter 3a, a pair of guide body supporting frames 3b, and a pair of connecting plates 3c. An engaging device 40 is secured to the reinforcement member 3f. The engaging device 40 comprises a pair of engaging plates 41, and a pair of engaging hooks 42 secured to ends of plates 41 and a lock pin 41a. As shown in FIG. 7, the engaging hook 42 engage with the shaft 20. The guide body supporting frames 3b and connecting plates 3c secured to the frames 3b are provided for supporting the guide body 4 to dispose the body 4 on opposite sides of the belt crawlers 18.

The guide body 4 comprises a pair of wheel guide plates 25 for mounting wheels 23 of the wheelchair, a pair of caster guide plates 26 for supporting casters 24 of the wheelchair, and a pair of ramp plates 29. Each of guide plates 25, 26 and ramp plates 29 consists of a base plate and a pair of upright side plates to have a U-shaped section. Further, as shown in FIG. 3, each of plates has the same width and is formed to have a width enough guide and support the wheels 23 and casters 24 of the wheelchair 22 along the guide body 4 when the wheelchair 22 is mounted on the wheelchair carrier 2.

As shown in FIG. 1, the wheel guide plate 25 has a connecting member 25b provided on a rear portion thereof, which is secured to the guide body supporting frame 3b of the handle portion 3. The connecting plate 3c is secured to an inner side plate of the wheel guide plate 25.

As shown in FIG. 4, each wheel guide plate 25 is pivotally connected to the caster guide plate 26 through hinges 27 and 27a and a pin 27b. The hinge 27 has an oblique upper edge 27c having an angle α, so that if the caster guide plate 26 is raised from the ground, the plate 26 is tilted by the angle α. Each of wheel guide plates 25 and caster guide plates 26 has a stand member 28, provided on the undersides thereof. The stand members 28 are provided for holding the guide plates 25, 26 horizontal by grounding the stand members when the guide body 4 is positioned on the ground. A connecting bar 26b is secured to the opposite caster guide plates 26.

The ramp plate 29 is detachably connected to the caster guide plate 26. As shown in FIG. 5, the caster guide plate 26 has a joint member 26a provided on an end thereof. The ramp plate 29 has a hook 29a at an end corresponding to the joint member 26a. Thus, the ramp plate 29 is engaged with the caster guide plate 26. The ramp plate 29 is formed to ground the other end thereof when the wheelchair 22 is loaded on or unloaded from the guide body 4. When the ramp plate 29 is not used, the plate is disengaged from the caster guide plate 26 and attached to the outside of the side plate of the wheel guide plate 25.

As shown in FIG. 7, the wheel guide plate 25 has a stopper 25a having a triangle shape in side view provided on the rear portion thereof. The stopper 25a is provided to stop moving of the wheel 23 when the wheelchair 22 is mounted. The position of the stopper 25a is properly adjusted according to the size of the wheel. To this end, the stopper 25a is slidably mounted on the plate 25 along a hook 25c having several steps of hooks and adapted to be engaged with a proper hook by a projection 25e.

The handle portion 3 is locked to the wheelchair carrier 2 as shown in FIG. 7 by a lock device 30. The lock device comprises a hook 30a engaged with the pin 41a and disengaged by depressing a pedal 30b by a foot of the operator. When the lock device 30 is unlocked, the handle portion 3 can be rotated to the upright position as shown in FIG. 1. At the upright position, a pin 41b on an engaging member 41c secured to frame 3b engages with hook 30a.

Figure 8:
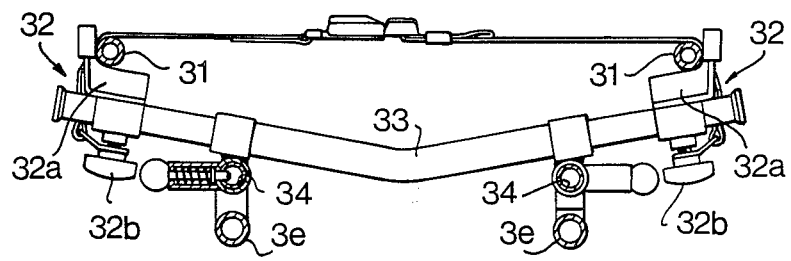
FIG. 8 is a plan view of a holding device.
Figure 9:
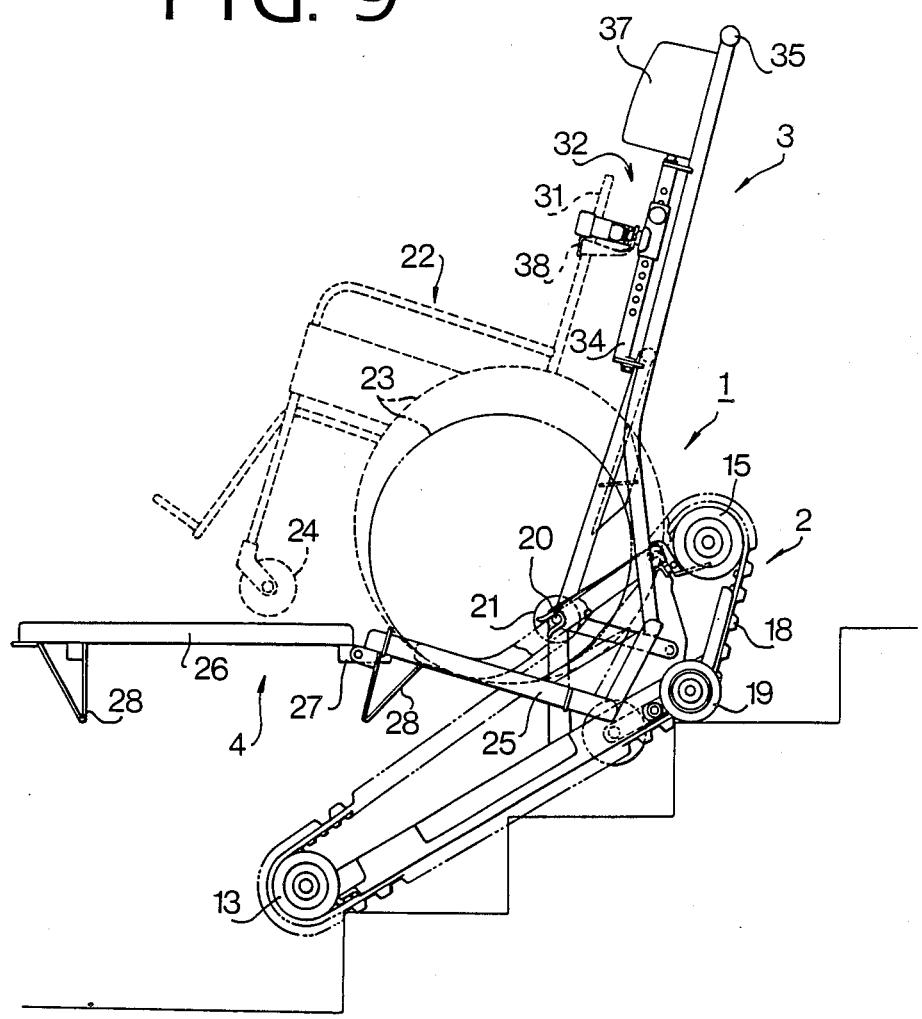
FIG. 9 is an explanatory view showing the stair-climbing operation of the carrier.

Referring to FIGS. 6, 8 and 9, a wheelchair holding device 32 is provided on the frame 3e of the handle 3. The wheelchair holding device 32 comprises a pair of guide bars 34 secured to the frame 3e, a back bar 33 secured to the guide bar 34, a pair of engaging devices 32a for engaging with handles 31 of the wheelchair 22. The back bar 33 is adapted to be moved along the guide bars 34 and secured thereto at a desired position, and each engaging device 32a is slidable on the back bar 33 and secured thereto by a screw 32b.

A switching device 36 is provided near the grips 35 of the handle portion 3 for operating the driving motor 7. Numeral 37 is a head rest provided on the handle portion 3.

To mount the wheelchair on the carrier 1, first the pedal 30b (FIG. 7) is depressed by the foot to release the hook 30a from the pin 41a. Then the handle portion 3 is rotated about the shaft 20 to the upright position as shown in FIG. 1. In such a position, stand members 28 are grounded to support guide plates 25, 26. Then, the ramp plate 29 is attached to the guide plate 26 by joint member 26a and hook 29a. Thereafter, the wheel-chair is moved on the guide plates 25, 26 passing through ramp plate 29 until the wheels 23 abut on stopper 25a, and then the handle 31 of the wheelchair 22 is engaged with engaging devices 32. Thereafter, the lock device 30 is disengaged and the handle portion 3 is rotated in the clockwise direction to the inclined position (FIG. 2) so that the pin 41a is engaged with the hook 30a. Thus, the wheelchair is held in position for ascending or descending the stair. At that time, the caster guide plate 26 rotates in the counterclockwise direction with respect to the pin 27b by the angle α, so that the plate 26 disengages from the caster 24 of the wheelchair 22. During the travelling of the carrier 1, the ramp plate 29 is removed.

To unload the wheelchair from the carrier, pedal 30b is depressed to disengage the hook 30a, and wheelchair is removed in the reverse order to the above described manner for mounting the wheelchair. At that time, since the caster 24 has been disengaged from the guide plate 26 and the caster has been oriented to the advance direction by its own weight, as shown in FIG. 2, the wheelchair can be easily and smoothly moved on/from the guide plates 26, 25.

In order to carry the wheelchair by the wheelchair carrier 1 on the ground, the handle portion 3 is lock in the upright position by engaging the hook 30a with pin 41b. In such a condition, the carrier 1 can be moved by wheels 19 and 19', slightly tilting the carrier rearwardly.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A stair-climbing wheelchair carrier having a carrier portion comprising a frame, a pair of endless belt crawlers and a driving motor; each of said endless belt crawlers having a span extending over two steps and an oblique overhang portion at one end of said frame which has a height higher than a usual height of a step of stair; a handle portion rotatably and detachably provided on said carrier portion; said handle portion being adapted to be pivoted between an upright position and an inclined position; means for securing said handle portion to said frame; the carrier comprising:
  a pair of wheel guide plates provided on both sides of the carrier and secured to a lower portion of said handle portion so as to be pivoted together with the handle portion and provided for guiding and mounting wheels of a wheelchair; and
  a pair of caster guide plates each of which is pivotally connected to a front end of said wheel guide plates, and provided for guiding wheels and casters of the wheelchair and for mounting the casters.

2. The stair-climbing wheelchair carrier according to claim 1, further comprising
  a pair of ramp plates each of which is hinged with a front end of the caster guide plate.

3. The stair-climbing wheelchair carrier according to claim 1, wherein
  the caster guide plate is provided to be downwardly rotated with respect to the wheel guide plate at a predetermined angle.

* * * * *